United States Patent [19]

Frye

[11] Patent Number: 4,773,499

[45] Date of Patent: Sep. 27, 1988

[54] STEERABLE WHEEL STRUCTURE FOR GROUND VEHICLES

[76] Inventor: Norman V. Frye, R.R. 5, Box 60, Davenport, Iowa 52806

[21] Appl. No.: 138,166

[22] Filed: Dec. 28, 1987

[51] Int. Cl.$^4$ .................. B62D 5/06; B62K 21/00
[52] U.S. Cl. .................... 180/152; 280/92; 280/270
[58] Field of Search .............. 180/152, 79, 13, 79.4; 280/92, 270, 263

[56] References Cited

FOREIGN PATENT DOCUMENTS 170386 10/1921 United Kingdom ............... 280/92
1100689 1/1968 United Kingdom ............... 280/92

Primary Examiner—John A. Pekar
Attorney, Agent, or Firm—Henderson & Sturm

[57] ABSTRACT

A vehicle having a fore-and-aft body including transversely spaced apart side walls or supports carries between the supports a forkless steerable wheel and axle structure arranged in conjunction with right and left force-exerting means so that on right-hand turns the wheel is steered about an upright right-hand axis and on the left-hand turns is steered about a left-hand axis. The arrangement, by dispensing with typical fork structure, provides for steering movement such that the wheel moves laterally away from the side wall opposite to the direction in which the wheel is steered.

9 Claims, 2 Drawing Sheets

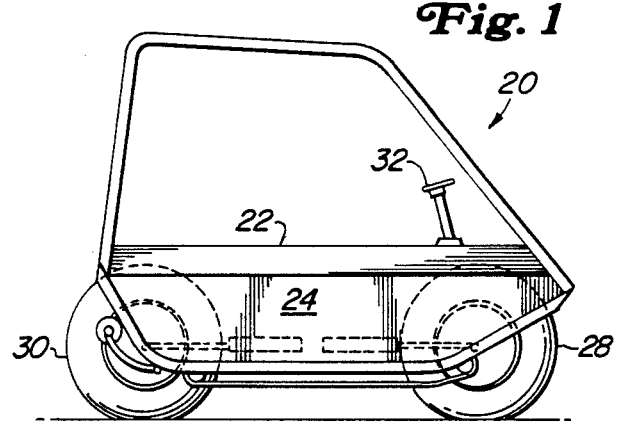
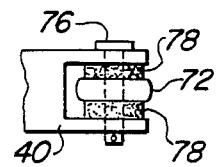
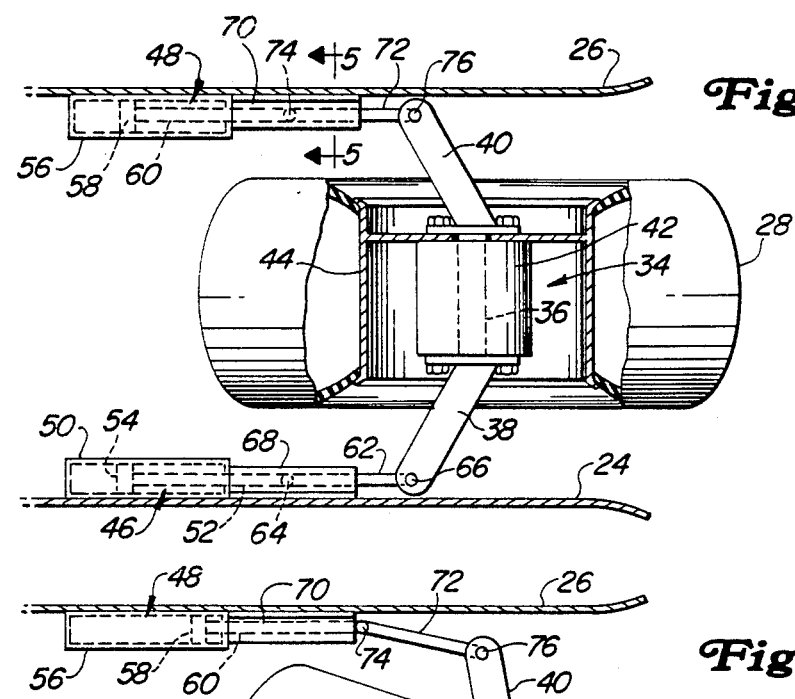
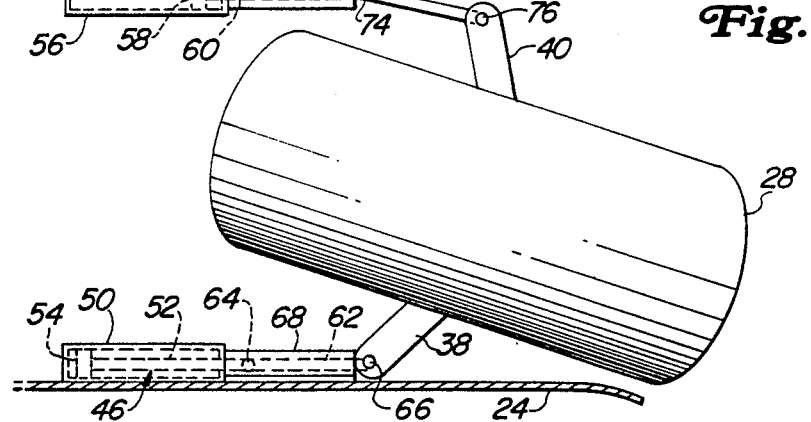

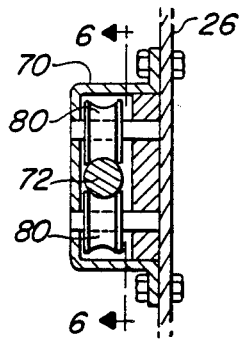
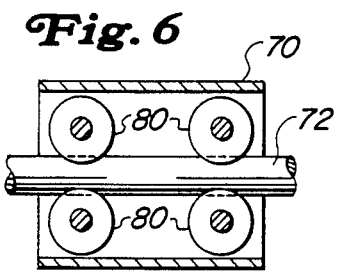
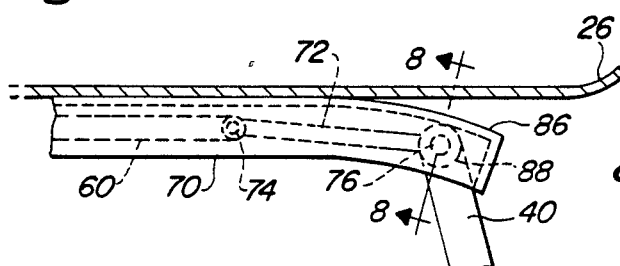
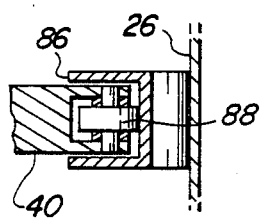
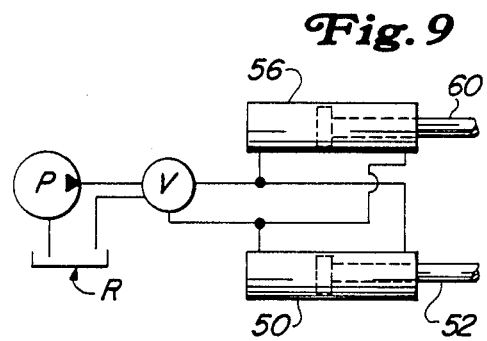
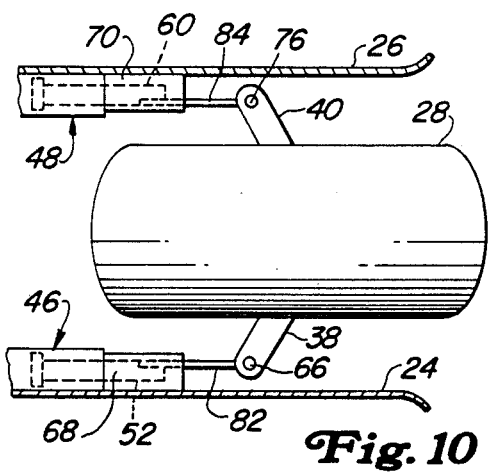
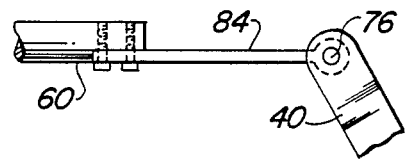

1

STEERABLE WHEEL STRUCTURE FOR GROUND VEHICLES

BACKGROUND AND SUMMARY OF THE INVENTION

The present invention is an improvement on the general vehicle structures forming the subject matters of U.S. Pat. Nos. 4,157,739 and 4,357,893 to Frye, in each of which the basic disclosure is a two-wheel, all-terrain vehicle in which both front and rear wheels are powered, as by hydrostatic motors, and simultaneously steered in opposite directions in order to decrease the steering radius. One disadvantage of a vehicle of that type is that the wheels are fork mounted, as in typical bicycles or motorcycles, and, when the vehicle is used in rough, muddy, etc. terrain, the forks accumulate various forms of debris, mainly mud and mud-packed stones and the like, which obviously interferes with efficient operation of the vehicle.

According to the present invention a steerable wheel structure is provided which does not require a steering fork. Instead, the wheel is disposed between opposite side supports of the vehicle and has transverse axle means including opposite ends connected to fore-and-aft, right and left force-exerting means. The connections of the axle ends to the force-exerting means includes provision for articulation, especially about right and left upright pivots about which the wheel is selectively turned as distinguished from a central axis as in a fork-mounted wheel. In addition to the flexibility and other advantages accruing from such an arrangement, the structure profits from stability and rigidity derived from the side wall or support structure. The steering arrangement is further such that the wheel moves bodily laterally, for example, away from the left wall on right turns and vice versa, thus increasing the amount of turning space available without interference between the wheel and side wall. Other features and advances flow from the guide means provided to assure efficient operation with a minimum of maintenance and repair.

These and other features and advantages will become apparent as the invention is disclosed in detail in the ensuing description and accompanying sheets of drawings.

DESCRIPTION OF THE DRAWINGS

FIG. 1 is a small-scale elevation of a representative type of vehicle in which the invention finds utility.

FIG. 2 is an enlarged view, partly in section and with parts omitted for clarity, of one form of steerable wheel structure, showing the wheel in straight-ahead position.

FIG. 3 is a similar view but showing the wheel as turned to the right.

FIG. 4 is a fragmentary view of a connection between the axle means and a force-transmitting member.

FIG. 5 is an enlarged section on the line 5—5 of FIG. 2.

FIG. 6 is a section on the line 6—6 of FIG. 5.

FIG. 7 is a fragmentary view, partly in section, of one form of guide structure for the force-transmitting member and its associated axle end.

FIG. 8 is a section on the line 8—8 of FIG. 7.

FIG. 9 is a schematic view of one form of hydraulic steering control means.

FIG. 10 is a view similar to FIG. 2 but showing another form of the invention.

FIG. 11 is a fragmentary view of a portion of the structure of FIG. 10.

DETAILED DESCRIPTION OF A PREFERRED EMBODIMENT OF THE INVENTION AND MODIFICATIONS

Reference will be had first to FIG. 1 for a general overview of one type of vehicle in which the invention may be used. The specific form of vehicle is not restrictive of the scope of the invention, since the invention has wide applicability. In FIG. 1, the numeral 20 designates a vehicle having a fore-and-aft body 22 made up of right and left, fore-and-aft longitudinal supports, here in the form of side walls 24 and 26. The vehicle is preferably of the all-terrain type and is carried on front and rear wheels 28 and 30. Both wheels are steerable and power driven as will appear in greater detail later herein. Steering may be controlled by a steering member 32.

The mounting and steerability of the front wheel is best shown in FIGS. 2 and 3. Although the details are directed mainly to the front wheel, it is obvious how they may be equally applicable to the rear wheel. Further, the invention may be exploited as well in vehicles in which only the front wheel is steered and also in which either or both wheels are power driven.

The wheel 28 is disposed centrally between the side walls or supports and is carried on axle means 34 which, in this case, comprises a center axle portion 36 and right and left end portions 38 and 40, respectively. The center portion is shown as being part of a typical hydrostatic motor 42 which is received in a typical dished wheel body 44. The connections of the right and left parts 38 and 40 to the center part will be clear from the drawing without further description. The side walls respectively carry right and left carriers 46 dn 48. These are fixedly carried by the respective side walls in any suitable fashion and derive strength and rigidity from the walls. The right carrier is in the form of a fixed member such as an elongated hydraulic cylinder 50 and further includes a movable member in the form of a piston rod 52 affixed to a piston 54 within the cylinder. Obviously, the piston rod is selectively movable horizontally fore and aft. A like arrangement exists on the left wall 26 as embodying a fore-and-aft cylinder 56 having a piston 58 connected to a left-hand piston rod 60. The relative dimensional widths of the wheel and side wall spacing are such as to provide a compact organization of sturdy construction capable of accommodating the extreme forces and loads typically encountered by an all-terrain vehicle.

In that form of the invention shown in FIGS. 2 and 3 and auxiliary figures, each piston rod is movable linearly because it is characteristically a part of the associated cylinder. In the case of the right piston rod, the forward end thereof terminates rearwardly short of the right end of the right axle end portion 38 but is nevertheless linked to that axle end by an articulate connecting element including a link 62 which has an upright pivotal connection 64 to the fore part of the piston rod 52 and a pivotal connection 66 to the axle end 38. A guide 68 is provided as a forward extension of the cylinder and serves to guide the link 62 in such manner as to confine a portion of the movement of the link to linear movement while permitting angular movement of the link is a further phase of its articulation. A mirror image of the right cylinder and related parts occurs at the left side wall 26 in which the carrier 48 includes the cylinder 56, piston rod 60, etc. already described and enhanced by a left guide 70 for a left link 72 having pivots at 74 and 76 respectively to the left piston rod 60 and left axle end 40.

FIGS. 4, 5 and 6 show one form of the guide means 70 and link 72. FIG. 4 illustrates the connection 76 of the link to the axle end 40 as including resilient means such as rubber or like blocks 78 for cushioning the shocks incident to operation. FIGS. 5 and 6 show that the guide 70 includes upper and lower rollers 80 engaging the link 72 so as to confine at least part of its movement to a linear path. These are but examples of guides that could be employed, given the structural and functional characteristics of the overall design.

FIG. 10 shows a modification in which the wheel axle ends are connected to the right and left piston rods 52 and 60 by right and left links 82 and 84, each in the form of sturdy bar or leaf spring capable of bending to accommodate swinging of the wheel during steering. FIG. 11 illustrates the bar spring attachment of the left link to the left piston rod 60. This link is pivoted to the left axle end 40 at 76 as before. The same structure occurs at the right side of the vehicle.

FIG. 7 shows another form of guide means. Although only the left side of the structure is shown, it will be clear that the right side is a mirror image. In this form of the invention, the guide 70 is extended forwardly as an arcuate channel 86 and the connection 76 of the link 72 to the left axle end 40 includes a roller 88 that follows the guide. The arrangement is such that on left turns, for example, the link 72, moving rearwardly, will be guided linearly in the guide portion 74, while on right turns, when the left force-exerting means is extended, the forwardly moving link will pivot at 74 as it is constrained to follow the arcuate guide portion 86 as the axle pivots about the rearwardly retracted right pivot 66. Compare FIG. 3. In the inventive form of FIGS. 2 and 3, respective links 62 and 64 will follow arcuate paths according to the direction of wheel turning because of the pivotal connections to their piston rods and axle ends, as will be explained in detail below.

FIG. 9 illustrates schematically one form of hydraulic means, for example, for powering the right and left cylinders 50 and 56, P representing a typical pump associated with a selective valve V and reservoir R. The valve is of course controlled by the steering member 32.

By way of explaining the operation of the steering system, reference will be had first to FIGS. 2 and 3. In FIG. 2 it is seen that both force-exerting means are in mid-positions, and the wheel 28 is in a straight-ahead position. In accomplishing a right turn as in FIG. 3, the right piston rod 62 is retracted while the left piston rod is extended. Upon retraction of the right piston rod, its link 62 is drawn into the linear guide 68, thus moving the pivot 66 at the right axle end also rearwardly in a straight line rather than arcuately. At the same time, the left link 72, because of its pivots 74 and 76, moves out of its guide 70, thus allowing the axle left end to swing in an arc about the confined right pivot 66. This type of pivoting distinguishes from typical fork steering, which would normally be about a substantially vertical axis through the fork pivot which is generally fairly close to an upright extension normal to the centerline between the axle ends, barring different offsets sometimes resorted to. Stated otherwise, because of the type of steering disclosed here, the vertical centerline of the wheel—i.e., the centerline midway between the ends of the axle—shifts to the right or left, depending upon the direction of steering. With the offset axle as shown, the centerline shift is even greater. In otherwords, as stated, fork-mounted wheels would turn about the centerline, whereas the wheel in the present case may be said to turn or steer about a virtual centerline offset from a fork centerline.

Another feature of the swept-back axle occurs in improvement in the vehicle ride, especially where rubber mounts are used as in FIG. 4, because there is a short but effective lever arm or moment resulting from the fore-and-aft distance between the swept back ends and the center portion.

Still further features are that the vehicle has a lower over-all appearance, thus increasing stability; a clean wheel well; and greater clearance between the wheel and side walls.

In the case of the FIG. 10 modification, the bar springs will flex laterally in the steering circumstances just described, while in the FIG. 7 form, the arcuate guides positively control the swinging. In all instances, the pivot is about the right pivot 66 on right turns and the left pivot 76 on left turns, and in all cases the wheel moves away from the side wall opposite to the direction of turning, thus increasing the space between the turned wheel and the side wall away from which it moves, leading to the possibility of narrowing the vehicle body. The rearwardly "swept" axle ends augment the function of the steering system, especially by disposing the pivots 66 and 76 rearwardly of the rolling axis of the wheel.

Features and advantages of the invention, other than those noted herein, will readily occur to those versed in the art, as will many modifications in and additions to the preferred embodiments disclosed, all without departing from the spirit and scope of the invention.

I claim:

1. In a ground vehicle having a fore-and-aft body including transversely spaced apart, right and left, fore-and-aft supports: steerable wheel structure comprising transverse axle means disposed between the supports and having right and left end portions respectively adjacent to the right and left supports, a wheel journaled on the axle means intermediate the supports on a transverse horizontal axis, right and left carriers respectively on the right and left supports, each including a fixed element mounted fixedly on the associated support and a movable member arranged for selective fore-and-aft movement relative to the support and relative to each other, right and left connecting means connecting the right and left movable members respectively to the right and left end portions of the axle means for effecting steering of the wheel as one carrier moves forward and the other mvoes simultaneously rearwardly, and vice versa, at least one of the members at each side of the body being constructed to accommodate fore-and-aft swinging of the axle means during steering of the wheel, and means for moving the movable members simultaneously, one forwardly and the other rearwardly.

2. Steerable wheel structure according to claim 1, further characterized in that axle means includes a center portion disposed normal to the supports in the straight-ahead position of the wheel and the end portions are joined in the center portion and project rearwardly and outwardly from the center portion.

3. Steerable wheel structure according to claim 1, further characterized in that each movable member is confined to fore-and-aft linear movement and each connecting member includes a laterally articulate part for accommodating lateral movement of the axle means end portions relative to the linearly movable members during steering of the wheel.

4. Steerable wheel structure according to claim 3, in which each articulate part is a link pivoted at one end to the associated movable member and at its other end to the associated end portion of the axle means for accommodating lateral movement of the axle means as aforesaid.

5. Steerable wheel structure according to claim 3, in which each articulate part is a resilient element connected between the associate movable member and axle means end portion and capable of lateral flexing for accommodating lateral movement of the axle means as aforesaid.

6. Steerable wheel structure according to claim 3, including right and left guide means respectively on the right and left supports and respectively engaging the right and left movable members for guiding the members linearly.

7. Steerable wheel structure according to claim 3, including right and left arcuate guide means respectively on the right and left supports and associated respectively with the axle means end portions for guiding said end portions during steering of the wheel.

8. Steerable wheel structure according to claim 7, including right and left linear guide means respectively on the supports for respectively guiding the movable members.

9. Steerable wheel structure according to claim 1, in which the right and left articulate elements respectively include right and left upright pivots, and means is provided for ceasing the wheel to pivot about the right pivot on right turns and to pivot about the left pivot on left turns.

* * * * *